(12) United States Patent
Bossner et al.

(10) Patent No.: US 8,720,905 B2
(45) Date of Patent: May 13, 2014

(54) SEALED T-JOINT ASSEMBLY

(75) Inventors: Michael Bossner, Sterling Heights, MI (US); Curt R. Danielewicz, Macomb, MI (US); Keith A. Stahl, Vassar, MI (US); Brian W. Geiser, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/473,887

(22) Filed: May 17, 2012

(65) Prior Publication Data

US 2013/0306008 A1    Nov. 21, 2013

(51) Int. Cl.
*F02F 11/00* (2006.01)
*F16J 15/14* (2006.01)

(52) U.S. Cl.
USPC ........... 277/591; 277/590; 277/598; 277/630; 277/637

(58) Field of Classification Search
USPC .......................... 277/590–591, 598, 630, 637
See application file for complete search history.

(56) References Cited

U.S. PATENT DOCUMENTS

| | | | |
|---|---|---|---|
| 6,337,120 B1 * | 1/2002 | Sasaki et al. | 428/66.4 |
| 7,210,220 B2 * | 5/2007 | Frank et al. | 29/731 |
| 7,348,092 B2 * | 3/2008 | Frank et al. | 429/437 |
| 7,482,391 B1 * | 1/2009 | Cross et al. | 521/91 |
| 7,511,102 B2 * | 3/2009 | Hasegawa et al. | 525/326.6 |
| 7,677,578 B2 * | 3/2010 | Taguchi | 277/592 |
| 7,790,094 B2 * | 9/2010 | Lim et al. | 264/478 |
| 8,342,538 B2 * | 1/2013 | Fonville et al. | 277/630 |
| 2008/0280040 A1 * | 11/2008 | Barrall et al. | 427/256 |
| 2011/0006483 A1 * | 1/2011 | Svidron | 277/316 |
| 2011/0204581 A1 * | 8/2011 | Takahashi et al. | 277/598 |
| 2012/0313331 A1 * | 12/2012 | Yamamoto | 277/650 |
| 2012/0325449 A1 * | 12/2012 | Okamoto et al. | 165/173 |

* cited by examiner

*Primary Examiner* — Lindsay Low
*Assistant Examiner* — Tea Holbrook
(74) *Attorney, Agent, or Firm* — Quinn Law Group, PLLC

(57) ABSTRACT

A sealed t-joint includes a first component having a first sealing surface, a second component having a second sealing surface, and a third component including a channel characterized by a channel height, channel width, and a channel depth. The t-joint also includes a gasket having a thickness and a protrusion characterized by a protrusion height, a protrusion width, and a protrusion depth. The protrusion height is less than the channel height, the protrusion width is less than channel width, and the protrusion depth is less than the channel depth. The t-joint additionally includes a polymer sealant. The gasket is compressed between the first and second sealing surfaces to generate a first and second component sub-assembly. Additionally, the polymer sealant is applied into the channel. The third component is subsequently assembled with the first and second component sub-assembly such that the protrusion extends into the channel to seal the t-joint.

12 Claims, 3 Drawing Sheets

SEALED T-JOINT ASSEMBLY

TECHNICAL FIELD

The disclosure relates to a sealed multi-component t-joint assembly.

BACKGROUND

Various mechanisms and structures may be assembled from multiple components along specifically designed interfaces. Assembly of such multi-component interfaces frequently results in a t-joint type of an assembly. Depending on the subject mechanism or structure, such interfaces may need to be sealed in order to prevent leakage of a fluid from, as well as to keep external contaminants out of, the resultant assembly.

SUMMARY

A sealed t-joint includes a first component having a first sealing surface, a second component having a second sealing surface, and a third component including a channel characterized by a channel height, channel width, and a channel depth. The sealed t-joint also includes a gasket having a thickness and a protrusion characterized by a protrusion height, a protrusion width, and a protrusion depth. The protrusion height is less than the channel height, the protrusion width is less than the channel width, and the protrusion depth is less than the channel depth. The sealed t-joint additionally includes a polymer sealant, which may be applied in the form of a bead. The gasket is placed and compressed between the first and second sealing surfaces to generate a first and second component sub-assembly. Additionally, the polymer sealant is applied into the channel. The third component is subsequently assembled with the first and second component sub-assembly such that the protrusion extends and becomes inserted into the channel to seal the t-joint.

The polymer sealant may be formulated from a room-temperature vulcanized (RTV) material.

The first component may be a cylinder block of an internal combustion engine, the second component may be a cylinder head of the engine, the third component may be an engine cover, and the gasket may be a head gasket of the engine. In such a case, the head gasket may be configured as a multi-layer steel component.

The gasket may be compressed between the first and second sealing surfaces by fastening of the second component to the first component. Subsequently, the third component may be assembled with the first and second component sub-assembly by the third component being fastened to each of the first and second components.

The applied polymer sealant may include a predetermined amount of polymer such that the predetermined amount of polymer substantially fills the channel.

The polymer sealant may be applied into the channel as a bead having a predetermined cross-section in fluid form via a manual or automatic dispenser.

The first component may be aligned with respect to the gasket prior to the gasket being being placed and compressed between the first and second components. Additionally, the third component may be aligned with the first and second sub-component assembly to align the protrusion and the channel.

A method of sealing a t-joint according to the above description is also disclosed.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
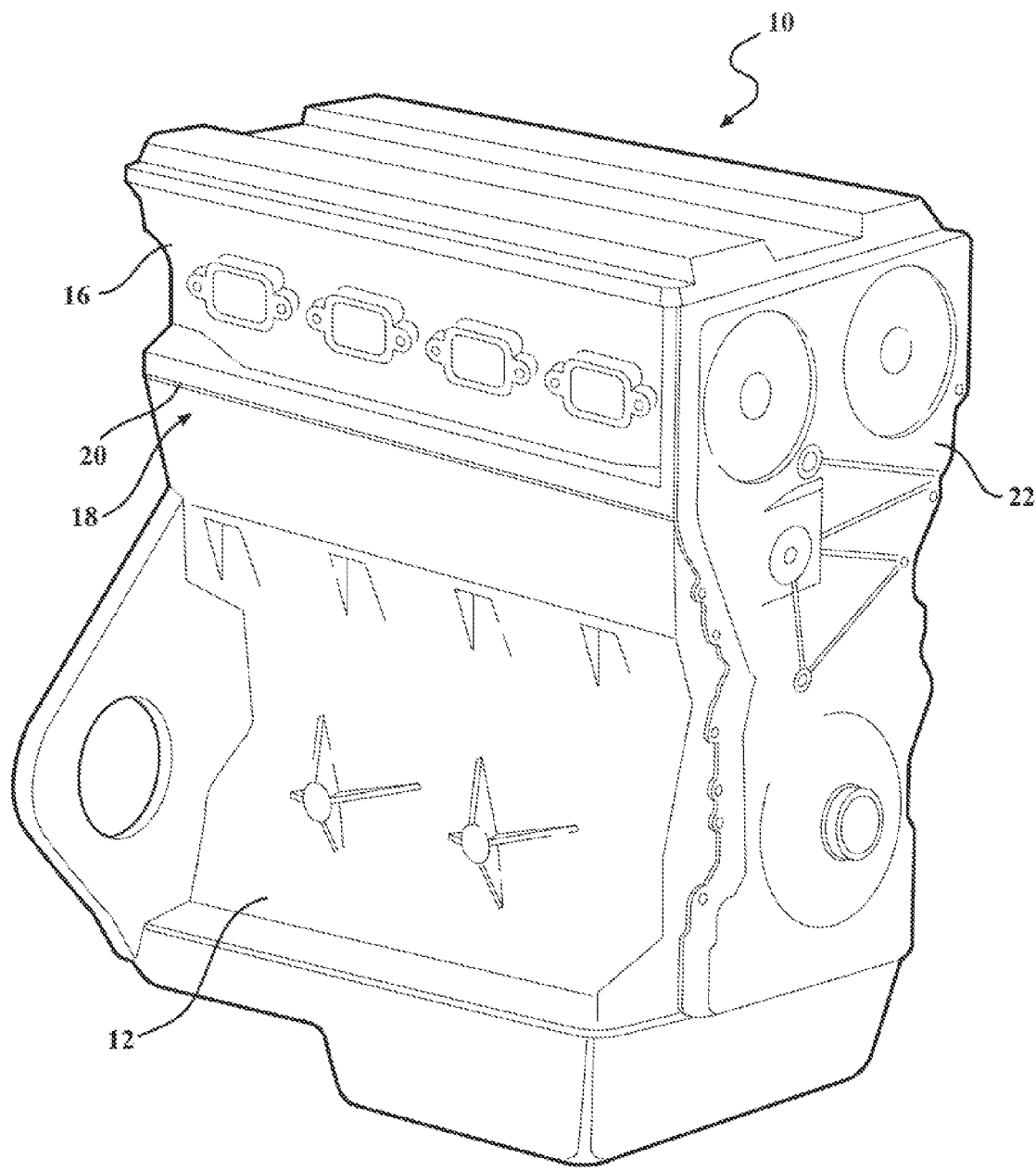
FIG. 1 is a depiction of an internal combustion engine assembly including a cylinder block, a cylinder head, and an engine cover assembled as a t-joint that is sealed by a head gasket and a polymer sealant.

Referring to the drawings, wherein like reference numbers refer to like components, FIG. 1 shows an internal combustion (IC) engine assembly 10. The engine assembly 10 includes a cylinder block 12 that is configured to accept a crankshaft, connecting rod, and piston sub-assembly or rotating assembly (not shown). As understood by those skilled in the art, the crankshaft is configured to rotate within the cylinder block and motivate the connecting rods to reciprocate the pistons. The crankshaft, connecting rods, and pistons are not individually shown, but their configuration and positioning within the cylinder block 12 are known to those skilled in the engine art.

Figure 2:
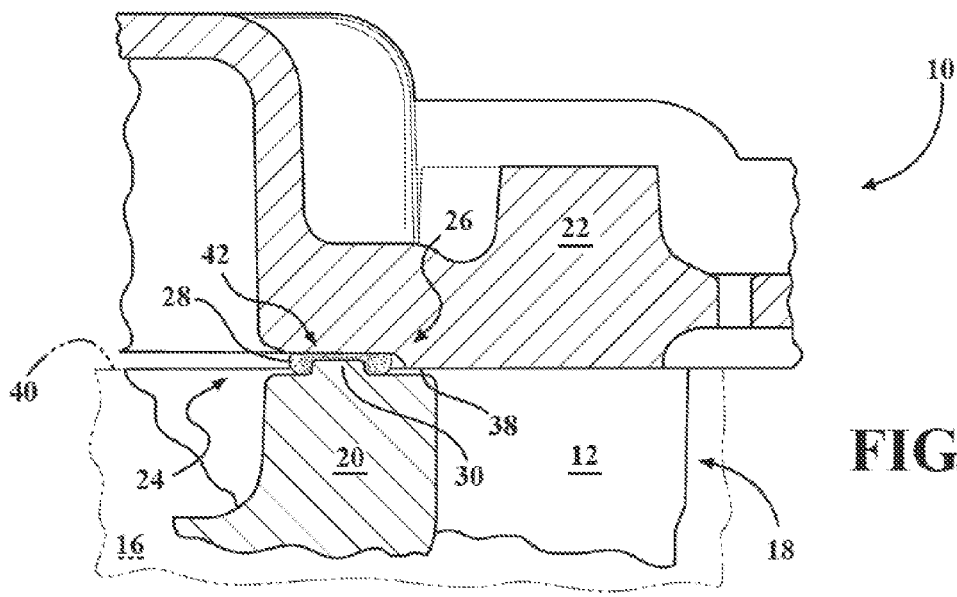
FIG. 2 is a close-up cross-sectional view of the fully assembled t-joint shown in FIG. 1.

As shown in FIGS. 1 and 2, the engine assembly 10 also includes a cylinder head assembly 16. The cylinder head assembly 16 generally includes a cylinder casting, which is typically machined to accommodate intake and exhaust valves, and may include a camshaft for actuating intake and exhaust valves for controlling combustion inside the engine. The intake and exhaust valves, as well as the camshaft, are not individually shown, but their configuration and positioning within the cylinder head assembly 16 are known to those skilled in the engine art. Depending on the specific configuration of the engine assembly 10, if the camshaft is not included in the cylinder head assembly 16, then typically the camshaft is located in the cylinder block 12.

A cylinder block and head sub-assembly 18 is generated when the cylinder block 12 is mated with the cylinder head assembly 16. A gasket 20, generally called a head gasket, is placed between the cylinder block 12 and the cylinder head assembly 16. Prior to the cylinder head assembly 16 being placed and aligned with the cylinder block 12, the gasket 20 may be aligned with the cylinder block 12. Such alignment may be affected by any appropriate means, such as dowel pins (not shown), to assure precise construction of the sub-assembly 18. Subsequently, the gasket 20 is compressed between the cylinder block 12 and the cylinder head assembly 16 by the cylinder head assembly being fastened to the cylinder block via suitable means, such as bolts. The gasket 20 may be configured as a multi-layer steel component that is capable of absorbing unequal thermal expansion and contraction rates of the cylinder block 12 and the cylinder head assembly 16 during operation of the IC engine 10 to aid with sealing the cylinder block and head sub-assembly 18.

Figure 4:
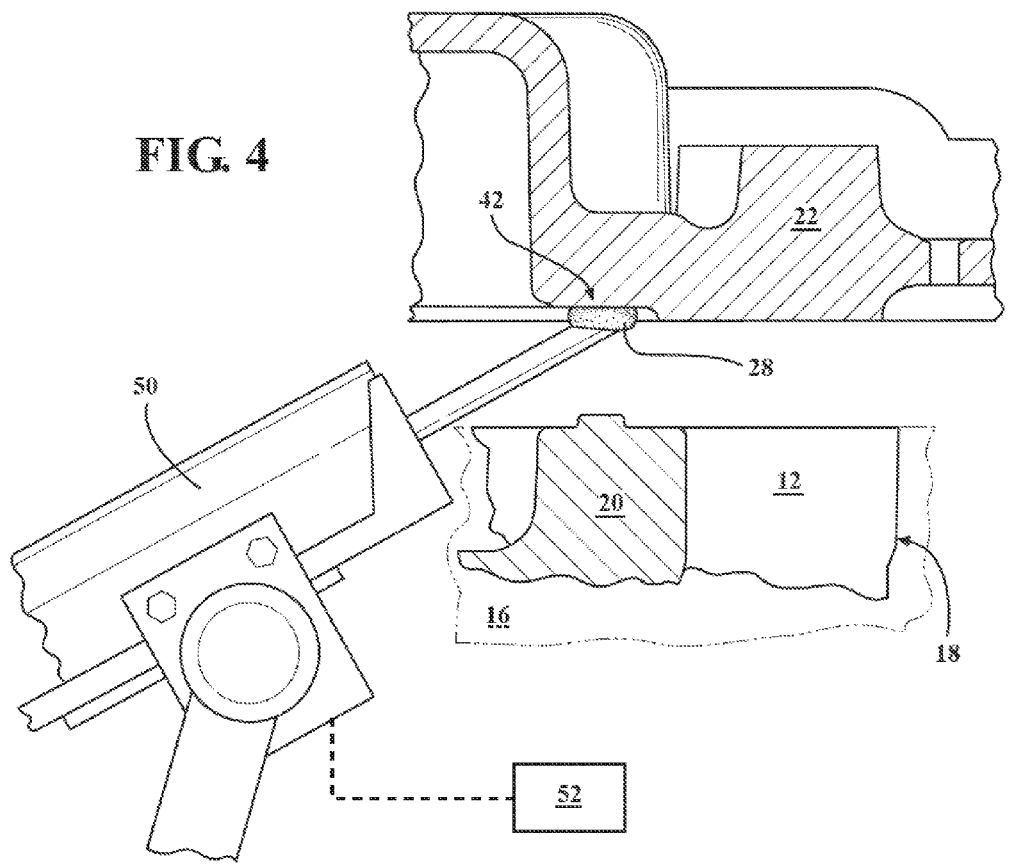
FIG. 4 is a close up cross-sectional partial view of a bead formed from the polymer sealant being applied to a channel of the engine cover.

As additionally shown in FIGS. 1-2, the engine assembly 10 also includes an engine cover 22. The engine cover 22 is configured to close off engine internal components such as the camshaft and the rotating assembly 14, and to minimize access of external debris into and leakage of lubricating and cooling fluids from the engine assembly 10. The engine cover 22 is assembled with the cylinder block and head sub-assembly 18, thus generating a multi-component t-joint 24 with an interface 26 therebetween. The engine cover 22 is oriented with the cylinder block and head sub-assembly 18. Furthermore, the engine cover 22 may be aligned with respect to the cylinder block and head sub-assembly 18 by any appropriate means, such as dowel pins (not shown), to assure precise construction of the engine assembly 10. As shown in FIGS. 2 and 4, the engine assembly 10 is additionally sealed via a polymer sealant 28. The polymer sealant 28 may be a specially formulated room-temperature vulcanized (RTV) material. The polymer sealant 28 may be specifically selected for its flexibility, as well as adhesive and fluidly impenetrable nature that is retained at operating conditions of the engine assembly 10 after the sealant has dried. The polymer sealant 28 is typically applied to the interface 26 in the form of a continuous bead.

The polymer sealant 28 is useful for sealing multi-component joints, such as the t-joint 24 generated by mating of the cylinder block and head sub-assembly 18 with the engine cover 22. Furthermore, the polymer sealant 28 is particularly useful for sealing a t-joint when such a joint has a large gap variation. Typically, a joint is said to have a large gap variation when design and/or manufacturing tolerances of the mating components become a significant percentage of the dimensionally nominal fit between the mating components or a gasket employed therein.

Figure 3:
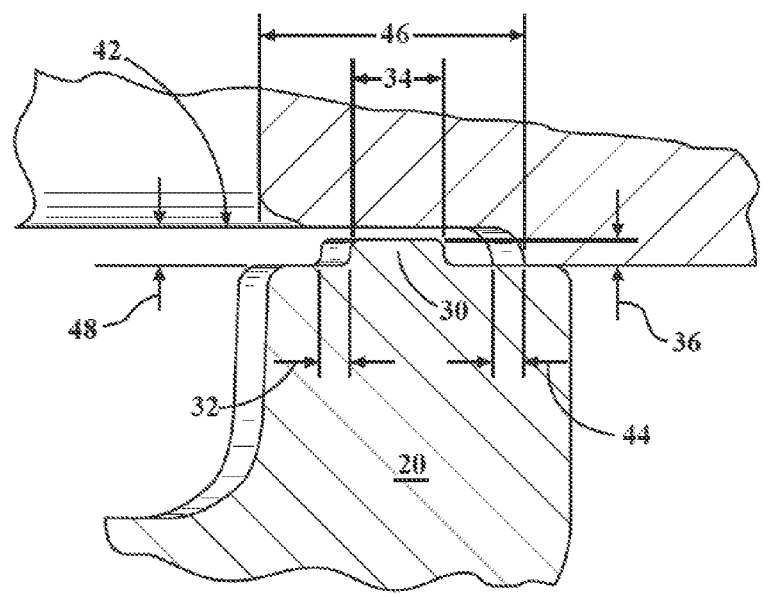
FIG. 3 is a close up cross-sectional perspective view of the cylinder block, the cylinder head, and the head gasket shown in FIG. 2 being combined into a sub-assembly.

As shown in FIG. 3, in order to minimize the effects of the above-described large gap variation, the IC engine assembly 10 includes additional features to aid in its sealing. Specifically the gasket 20 includes a protrusion 30. The protrusion 30 is characterized by a protrusion height 32, a protrusion width 34, and a protrusion depth 36. In the case that the gasket 20 is a multi-layer steel component, as described above, the protrusion may be formed from either one or all the layers of the gasket. Complementary to the protrusion 30, the cylinder block 12 includes a first sealing surface 38, the cylinder head assembly 16 includes a second sealing surface 40, and the engine cover 22 includes a channel 42. The channel 42 is characterized by a channel height 44, a channel width 46, and a channel depth 48. The protrusion height 32 is less than the channel height 44, the protrusion width 34 is less than the channel width 46, and the protrusion depth 36 is less than the channel depth 48. The relative dimensions of the protrusion height 32, the channel height 44, the protrusion width 34, the channel width 46, the protrusion depth 36, and the channel depth 48 are critical for proper meshing and fit of the protrusion 32 and the channel 42 in the engine assembly 10.

After the gasket 20 is placed and compressed between the first and second sealing surfaces, 38 and 40, respectively, to generate the cylinder block and head sub-assembly 18, the polymer sealant 28 is applied into the channel 42. As shown in FIG. 4, the polymer sealant 28 may be applied into the channel 42 in fluid form as a bead having a predetermined cross-section via a manual device (not shown) or an automatic dispenser 50. The dispenser 50 may be part of a robotic arm that is programmed to follow a predetermined path defined by the channel 46 and regulated by a specifically programmed controller 52. Moreover, the polymer sealant 28 may be applied into the channel 42 such that the predetermined amount of polymer sealant substantially fills the channel. Following the application of the polymer sealant 28, the engine cover 22 is assembled with the cylinder block and head sub-assembly 18 such that the protrusion 30 extends and is inserted into the channel 42 to reliably seal the IC engine assembly 10. As noted, the engine cover 22 is oriented with the cylinder block and head sub-assembly 18, and may be additionally aligned to ensure precise fit of the protrusion 30 of the gasket 20 into the channel 42 of the engine cover 22.

The engine cover 22 may be assembled with the cylinder block and head sub-assembly 18 by being fastened to each of the cylinder block 12 and cylinder head assembly 16 via any appropriate means, such as bolts. Such fastening of the engine cover 22 to the cylinder block and head sub-assembly 18 is intended to assure continuous contact between the polymer sealant 28, the gasket 20, and the channel 42, as well as suitable section thickness of the sealant inside the channel. As shown in FIG. 2, by finally mating the engine cover 22 to the cylinder block and head sub-assembly 18, the enclosure of the protrusion 30 becomes complete, while the channel 42 becomes filled with the polymer sealant 28 to thereby fully seal the t-joint 24. Finally, when the engine cover 22 is mated to the cylinder block and head sub-assembly 18, the neighboring component edges close off the channel 42 from communication with the outside environment. Such closure from the outside environment is important to prevent uncured polymer sealant 28 from being dislodged from the t-joint 24 when the IC engine assembly 10 is tested for effective sealing via pressurized air as part of the assembly process.

Figure 5:
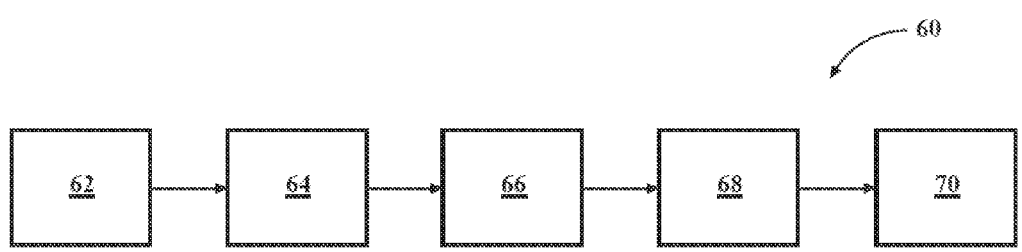
FIG. 5 is a flow chart illustrating a method of sealing the t-joint depicted in FIG. 2.

A method 60 of sealing a t-joint by using the gasket 20 is shown in FIG. 5, and described below with respect to FIGS. 1-4. The method commences in frame 62, wherein a first component, such as the cylinder block 12, having the first sealing surface 38, a second component, such as the cylinder head assembly 16, having the second sealing surface 40, a third component, such as the engine cover 22, and the gasket 20 are provided for use in the t-joint 24. The method then proceeds from frame 62 to frame 64. In frame 64, the method includes placing and compressing the gasket 20 between the first sealing surface 38 and the second sealing surface 40 to generate a first and second component sub-assembly, such as the cylinder block and head sub-assembly 18.

To assure precise assembly, prior to placing the second component and compressing the gasket 20 between the first and second components, the gasket and subsequently the second component may be aligned with respect to the first component. As described above with respect to FIGS. 1-4, compressing the gasket between the first sealing surface 38 and the second sealing surface 40 may include fastening of the second component to the first component. Similarly, assembling the third component with the first and second component sub-assembly may also include fastening of the third component to each of the first and second components. Additionally, the third component may be aligned with the first and second sub-component assembly to align the protrusion 30 and the channel 42.

Following frame 64, the method advances to frame 66. In frame 66 the method includes applying the polymer sealant 28 into the channel 42 of the third component. A predetermined amount of polymer sealant 28 may be applied, such that the selected amount of polymer sealant substantially fills the channel 42. As described above, application of the polymer sealant 28 may be accomplished in fluid form via the dispenser 50. The dispenser 50 may be regulated by the controller 52 programmed to follow a predetermined path defined by the channel 42. After frame 66, the method advances to frame 68, wherein the method includes assembling the third component with the first and second component sub-assembly such that the protrusion 30 of the gasket 20 is inserted and extends into the channel 42 to seal the t-joint 24. Method 60 concludes in frame 70, with the t-joint 24 being fully encased with polymer sealant 28 and the channel 42 closed off from the environment by the edges of the mating components.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A sealed internal combustion (IC) engine assembly comprising:
   a cylinder block having a first sealing surface;
   a cylinder head having a second sealing surface;
   an engine cover defining a channel characterized by a channel height, channel width, and a channel depth, wherein the channel does not extend into the cylinder block or the cylinder head;
   a head gasket characterized by a thickness and including a protrusion characterized by a protrusion height, a protrusion width, and a protrusion depth, wherein the protrusion height is less than the channel height, the protrusion width is less than the channel width, and the protrusion depth is less than the channel depth; and
   a polymer sealant;
   wherein:
   the head gasket is placed and compressed between the first and second sealing surfaces to generate a cylinder block and head sub-assembly, the polymer sealant is located in the channel, and the engine cover is assembled with the cylinder block and head sub-assembly such that the protrusion extends into the channel to seal the IC engine assembly.

2. The engine assembly of claim 1, wherein the polymer sealant is formulated from a room-temperature vulcanized (RTV) material.

3. The engine assembly of claim 1, wherein the head gasket is compressed between the first and second sealing surfaces by fastening of the cylinder head to the cylinder block, and the engine cover is assembled with the cylinder block and head sub-assembly by the engine cover being fastened to each of the cylinder block and cylinder head.

4. The engine assembly of claim 1, wherein the applied polymer sealant includes a predetermined amount of polymer such that the predetermined amount of polymer sealant substantially fills the channel.

5. The engine assembly of claim 4, wherein the polymer sealant is arranged in the channel as a continuous bead.

6. The engine assembly of claim 1, wherein the head gasket and cylinder block are aligned with respect to one another in the cylinder block and head sub-assembly, and wherein the engine cover is aligned with respect to the cylinder block and head sub-assembly to align the protrusion and the channel.

7. A method of sealing a t-joint, the method comprising:
   placing and compressing a gasket between a first sealing surface of a first component and a second sealing surface of a second component to generate a first and second component sub-assembly, wherein the gasket is characterized by a thickness and includes a protrusion characterized by a protrusion height, a protrusion width, and a protrusion depth;
   applying a polymer sealant into a channel defined by a third component, wherein the channel does not extend into the first component or the second component, wherein the channel is characterized by a channel height, a channel width, and a channel depth, and wherein the protrusion height is less than the channel height, the protrusion width is less than channel width, and the protrusion depth is less than the channel depth;
   assembling the third component with the first and second component sub-assembly such that the protrusion extends into the channel to seal the t-joint; and
   wherein the first component is a cylinder block of an internal combustion engine, the second component is a cylinder head of the engine, the third component is an engine cover, and the gasket is a head gasket of the engine.

8. The method of claim 7, wherein the polymer sealant is formulated from a room-temperature vulcanized (RTV) material.

9. The method of claim 7, wherein said compressing the gasket between the first and second sealing surfaces includes fastening of the second component to the first component, and wherein assembling the third component with the first and second component sub-assembly includes fastening of the third component to each of the first and second components.

10. The method of claim 7, wherein said applying the polymer sealant includes applying a predetermined amount of polymer sealant such that the predetermined amount of polymer sealant substantially fills the channel.

11. The method of claim 10, wherein said applying the predetermined amount of polymer sealant is accomplished in fluid form via one of a manual dispenser and an automatic dispenser.

12. The method of claim 7, further comprising aligning the first component and the gasket with respect to one another prior to said placing and compressing the gasket between the first and second components, and aligning the third component with the first and second sub-component assembly to align the protrusion and the channel.

* * * * *